US012746793B2

(12) United States Patent
Pyle et al.

(10) Patent No.: US 12,746,793 B2

(45) Date of Patent: Sep. 29, 2026

(54) AIR MANAGEMENT SYSTEM FOR VEHICLE

(71) Applicant: Beijing West Industries Co., Ltd., Beijing (CN)

(72) Inventors: Steven Edward Pyle, New Lebanon, OH (US); David Fredrick Reuter, Beavercreek, OH (US); Randall Lee Hofmann, Dayton, OH (US)

(73) Assignee: BeijingWest Industries Co., Ltd., Beijing (CN)

( * ) Notice: Subject to any disclaimer, the term of this patent is extended or adjusted under 35 U.S.C. 154(b) by 0 days.

(21) Appl. No.: 19/045,080

(22) Filed: Feb. 4, 2025

(65) Prior Publication Data

US 2025/0249721 A1 Aug. 7, 2025

Related U.S. Application Data

(60) Provisional application No. 63/549,901, filed on Feb. 5, 2024.

(30) Foreign Application Priority Data

Jan. 26, 2025 (CN) ......................... 202510125138.2

(51) Int. Cl.
*B60G 17/052* (2006.01)

(52) U.S. Cl.
CPC .. *B60G 17/0523* (2013.01); *B60G 2500/2044* (2013.01)

(58) Field of Classification Search
CPC ........ B60G 17/0523; B60G 2500/2021; B60G 2500/2044; B60G 2500/30

(Continued)

(56) References Cited

U.S. PATENT DOCUMENTS 5,465,209 A 11/1995 Sammut et al.
8,047,551 B2 * 11/2011 Morris .............. B60G 17/0525 137/625.21

(Continued)

FOREIGN PATENT DOCUMENTS

CN 106976373 A 7/2017
CN 107813671 A 3/2018

(Continued)

OTHER PUBLICATIONS

The First Office Action and Search Report issued on Oct. 23, 2025 for counterpart Chinese patent application No. 202510125138.2, along with machine EN translation (20 pages).

(Continued)

*Primary Examiner* — James A English
*Assistant Examiner* — Caitlin Anne Miller
(74) *Attorney, Agent, or Firm* — Dickinson Wright PLLC

(57) ABSTRACT

An air management system for a vehicle having a body and plurality of wheels, including: a reservoir tank for storing compressed air and filling at least one air spring of the vehicle, and a compressed air supply unit for supplying the compressed air, which includes a compressed air port to the reservoir tank and the at least one air spring, a vent port to a venting environment, and a piloted exhaust valve connected to the compressed air port and configured to vent the at least one air spring through the vent port, the piloted exhaust valve having a piloted control port. The reservoir tank is pneumatically connected to the piloted control port of the piloted exhaust valve, and is configured to provide a control pressure to the piloted control port to open the piloted exhaust valve during venting of the at least one air spring.

18 Claims, 7 Drawing Sheets

(58) Field of Classification Search
USPC .................................................... 280/124.16
See application file for complete search history.

(56) References Cited

U.S. PATENT DOCUMENTS

| | | | | |
|---|---|---|---|---|
| 8,777,246 | B2 * | 7/2014 | Meier ................ | B60G 17/0565 280/124.16 |
| 10,017,025 | B2 * | 7/2018 | Reuter ................. | B60G 17/018 |
| 11,034,205 | B2 * | 6/2021 | Reuter ................. | B60G 17/018 |
| 11,192,407 | B2 * | 12/2021 | Cervantez ............ | G05D 16/185 |
| 2001/0004443 | A1 * | 6/2001 | Behmenburg ......... | B60G 21/10 417/302 |
| 2005/0269753 | A1 * | 12/2005 | Geiger ................... | B60G 11/27 267/64.27 |
| 2013/0320645 | A1 | 12/2013 | Gall | |
| 2018/0079273 | A1 | 3/2018 | Ito et al. | |
| 2023/0122679 | A1 * | 4/2023 | Reuter .................... | F04B 39/14 |

FOREIGN PATENT DOCUMENTS

| | | |
|---|---|---|
| CN | 109414971 A | 3/2019 |
| CN | 109466270 20 | 3/2019 |

OTHER PUBLICATIONS

The Supplementary Search Report issued on Feb. 24, 2026 for counterpart Chinese patent application No. 202510125138.2, along with machine EN translation (3 Pages).

* cited by examiner

AIR MANAGEMENT SYSTEM FOR VEHICLE

CROSS-REFERENCE TO RELATED APPLICATIONS

The present disclosure claims the benefit of U.S. Provisional Application No. 63/549,901, filed on Feb. 5, 2024, and Chinese Patent Application No. 202510125138.2, filed on Jan. 26, 2025, which are incorporated herein by reference in their entireties.

TECHNICAL FIELD

The present disclosure relates generally to an air management system for a vehicle.

BACKGROUND OF THE INVENTION

Air suspension assemblies are known in the art for use on various vehicles, including automobiles. Air suspension assemblies typically include a plurality of air springs, each for interconnecting the body and one of the wheels of the automotive vehicle for damping relative forces between the body and the wheels, and for adjusting the height of the automotive vehicle. One example of such an air suspension assembly is disclosed in U.S. Pat. No. 5,465,209 to Sammut et al. The air suspension assembly includes a compressor for filling the air springs as well as a plurality of valves that are disposed between the compressor and the air springs and controlled by a controller for regulating air flow from the compressor to the air springs.

Known air management systems can be relatively expensive, bulky and complex in design. Accordingly, there remains a need for low-cost improvements to such air management systems.

SUMMARY OF THE INVENTION

The present disclosure in its broadest aspect provides an air management system for a vehicle.

In an embodiment, the present invention provides an air management system for a vehicle having a body and plurality of wheels, the air management system including: a reservoir tank for storing compressed air and filling at least one air spring of the vehicle, and a compressed air supply unit for supplying the compressed air. The compressed air supply unit includes: a compressed air port to the reservoir tank and the at least one air spring, a vent port to a venting environment, and a piloted exhaust valve connected to the compressed air port and configured to vent the at least one air spring through the vent port, the piloted exhaust valve having a piloted control port. The reservoir tank is pneumatically connected to the piloted control port of the piloted exhaust valve, and is configured to provide a control pressure to the piloted control port to open the piloted exhaust valve during venting of the at least one air spring.

In an embodiment, the compressed air supply unit further includes an exhaust valve connected to the piloted control port, and the reservoir tank is pneumatically connected to and selectively pressurizes the piloted control port of the piloted exhaust valve via the exhaust valve.

In an embodiment, the compressed air supply unit defines a reservoir port, the reservoir tank is pneumatically connected to the reservoir port through a reservoir air line, and the reservoir port is pneumatically connected to a control port of the exhaust valve through a pressure transfer line.

In an embodiment, the air management system further comprises a manifold block, which pneumatically connects the at least one air spring, the compressed air port and the reservoir tank; and the reservoir tank is pneumatically connected to a control port of the exhaust valve via the manifold block.

In an embodiment, the manifold block comprises a boost valve and defines a boost outlet port, the compressed air supply unit defines a boost inlet port, and the reservoir tank is pneumatically connected to the control port of the exhaust valve via the boost valve, the boost outlet port and the boost inlet port.

In an embodiment, the compressed air supply unit defines a non-boost inlet port, the manifold block defines a non-boost outlet port, and the reservoir tank is pneumatically connected to the control port of the exhaust valve via the non-boost outlet port and the non-boost inlet port.

In an embodiment, the manifold block comprises an exhaust control valve and defines a first exhaust port; and the compressed air supply unit defines a second exhaust port, and the reservoir tank is pneumatically connected to the control port of the exhaust valve via the exhaust control valve, the first exhaust port, and the second exhaust port.

In an embodiment, the compressed air supply unit further comprises an exhaust valve (EV) connected to the piloted exhaust valve, and the reservoir tank is pneumatically connected to, independently of the exhaust valve, the piloted control port of the piloted exhaust valve.

In an embodiment, the air management system further comprises a manifold block, which pneumatically connects the at least one air spring, the compressed air port and the reservoir tank; and the reservoir tank is pneumatically connected to, independently of the exhaust valve, the piloted control port of the piloted exhaust valve via the manifold block.

In an embodiment, the manifold block comprises a boost valve and defines a boost outlet port, the compressed air supply unit defines a boost inlet port, and the reservoir tank is pneumatically connected to, independently of the exhaust valve, the piloted control port of the piloted exhaust valve via the boost valve, the boost outlet port and the boost inlet port.

In an embodiment, the exhaust valve is a three-way two-position valve which has a control port being blocked off, or the exhaust valve is a two-way two-position valve.

In an embodiment, the compressed air supply unit further includes: a compressor for providing compressed air to the reservoir tank and having at least one compressor stage; a compressed air main line between the compressor and the compressed air port, the piloted exhaust valve being arranged in the compressed air main line. The reservoir tank is configured to provide, independently of the pressure in the compressed air main line, the control pressure that is higher than a pressure in the compressed air main line to the piloted control port during venting of the at least one air spring.

In an embodiment, the air management system further includes: a central air line disposed between the at least one air spring and the compressed air port and fluidly connected to the least one air spring and the compressed air port; at least one spring air line extending between the central air line and the at least one air spring; and at least one suspension valve disposed along the at least one spring air line for selectively allowing and preventing air from flowing between the at least one air spring and the central air line.

In an embodiment, the air management system further includes: a reservoir air line extending between the reservoir tank and the central air line; and a first reservoir valve and a second reservoir valve that are disposed along the reservoir air line, each of the first and second reservoir valves having an orifice for allowing air to pass therethrough, and each of the reservoir valves selectively allowing air to pass through the reservoir valve between the reservoir tank and the central air line.

In an embodiment, the compressed air supply unit includes a compressor for providing compressed air to the reservoir tank and having at least one compressor stage, and defines a boost inlet port; the air management system further includes a boost valve between the reservoir air line and a boost air line which is connected to the boost inlet port for allowing air from the reservoir tank to pass to the compressor or the piloted control port via the boost inlet port.

In an embodiment, the air management system further includes: an electronic control unit electrically connected to each of the at least one suspension valve and the first and second reservoir valves for selectively opening and closing each of them; and a pressure sensor electrically coupled to the electronic control unit and connected to the central air line for reading a pressure of the at least one air spring.

In an embodiment, the air management system further includes: a dryer disposed inside the compressed air supply unit and coupled to the compressed air port for reducing moisture in air supplied by the compressed air supply unit before the air enters the reservoir tank and the at least one air spring; and a dryer isolation valve disposed in-line with the compressed air port for allowing the central air line to be isolated from the dryer.

In an embodiment, the reservoir tank is an external tank located outside of the compressed air supply unit and has a volume of 7 to 16 liters.

The embodiments of the present disclosure are able to achieve lower exhaust pressures with more cost-effective, compact, and simplified solutions.

BRIEF DESCRIPTION OF THE DRAWINGS

Advantages of the present disclosure will be readily appreciated, as the same becomes better understood by reference to the following detailed description when considered in connection with the accompanying drawings, in the drawings.

DETAILED DESCRIPTION OF THE EMBODIMENTS

Figure 1:
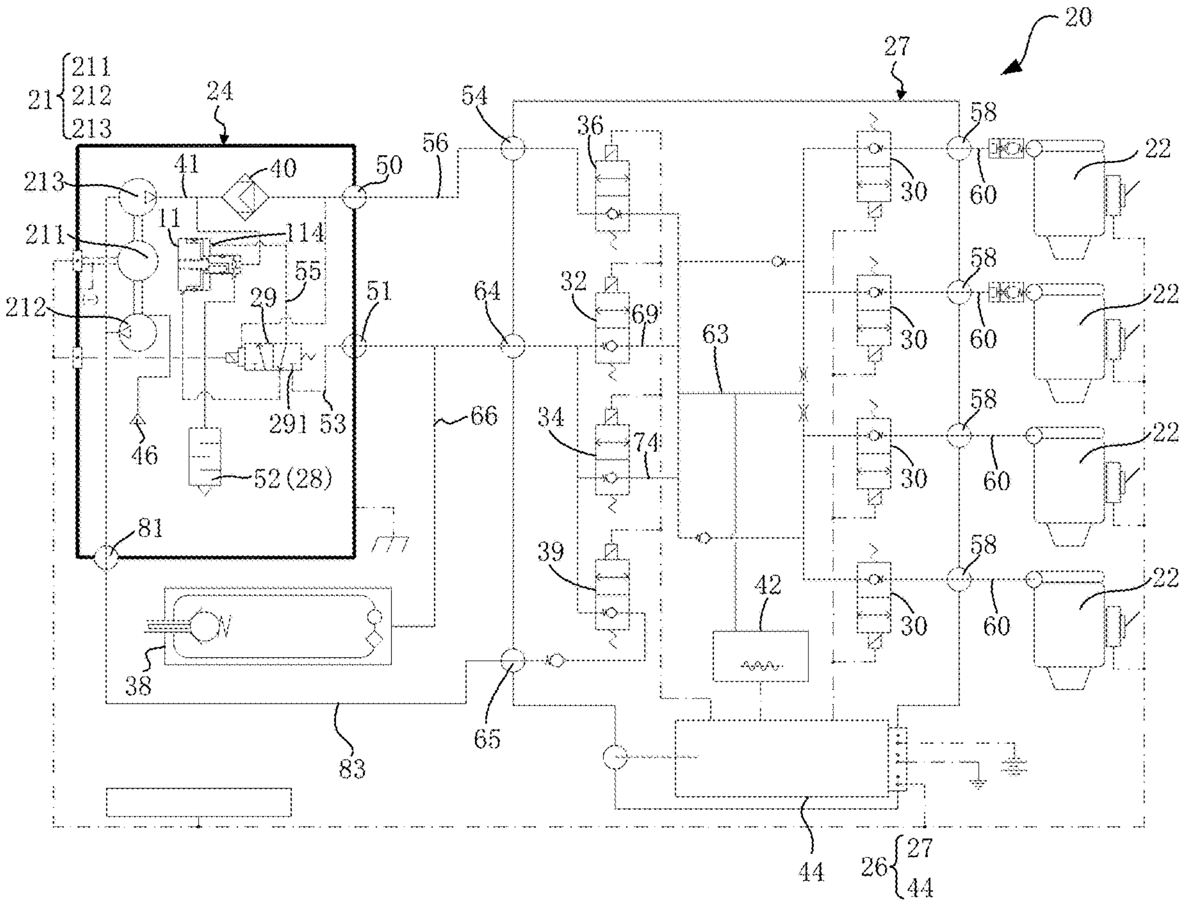
FIG. 1 is a schematic diagram of an air management system according to a first example embodiment of the present disclosure.

Referring to the drawings, the present disclosure will be described in detail in view of following embodiments.

Referring to the figures, an air management system 20, 120, 220, 320, 420, 520 is generally shown for controlling an air suspension assembly of a vehicle having a body and wheels. In the example embodiments, the subject air management system 20, 120, 220, 320, 420, 520 is described for use on an automobile having four wheels, however, it should be appreciated that it could be utilized on other vehicles having any number of wheels including, but not limited to, motorcycles and all-terrain vehicles.

As best presented in FIG. 1 and FIGS. 4-8, the air management system 20, 120, 220, 320, 420, 520 is connected to four air springs 22. Each of the air springs 22 interconnect the body and one of the wheels of the vehicle for damping relative forces between the body and the wheels of the vehicle, and for raising and lowering the vehicle to a desired height.

Figure 2:
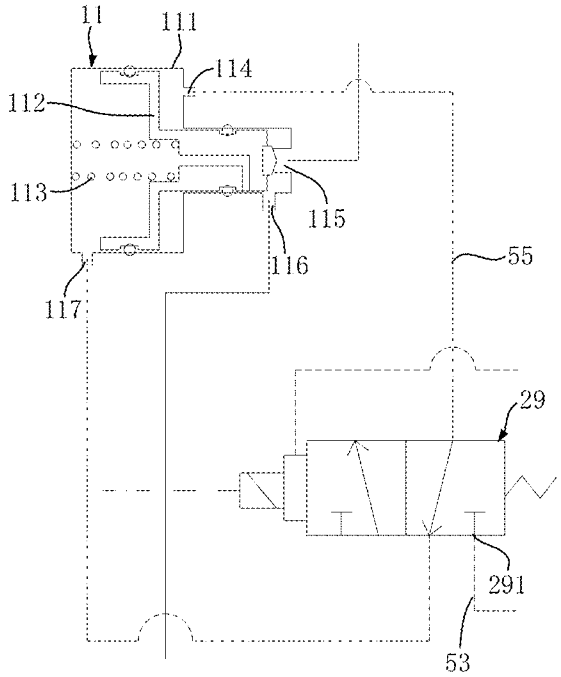
FIG. 2 is a schematic diagram of a piloted exhaust valve and an exhaust valve of FIG. 1, demonstrating the closed state of the piloted exhaust valve.
Figure 3:
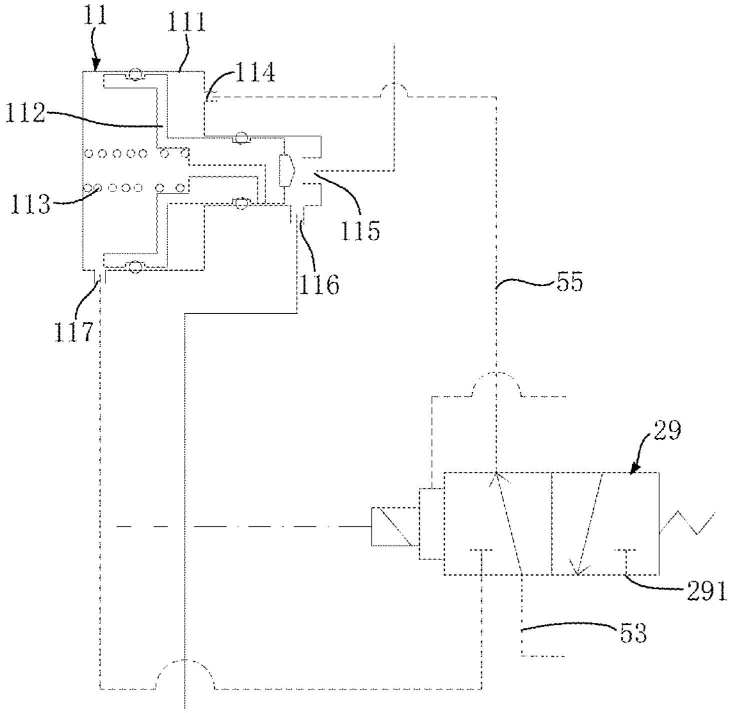
FIG. 3 is a schematic diagram of a piloted exhaust valve and an exhaust valve of FIG. 1, demonstrating the open state of the piloted exhaust valve.

FIG. 1 is a schematic diagram of an air management system 20 according to a first example embodiment of the present disclosure. FIG. 2 is a schematic diagram of a piloted exhaust valve and an exhaust valve of FIG. 1, demonstrating the closed state of the piloted exhaust valve. FIG. 3 is a schematic diagram of a piloted exhaust valve and an exhaust valve of FIG. 1, demonstrating the open state of the piloted exhaust valve.

As illustrated in the embodiment shown in FIG. 1, the air management system 20 includes a compressed air supply unit which may be a compressor assembly 21 for supplying compressed air, a reservoir tank 38 for storing the compressed air and filling the air springs 22, and an Intelligent Air Management Module (IAMM) which may be an Electro-Pneumatic Control Unit (EPCU) 26 for controlling raising and lowering of the vehicle.

The EPCU 26 includes a manifold block 27 having a plurality of valves 30, 32, 34, 36, 39 for controlling how the air springs 22 are filled and emptied. The EPCU 26 further includes an Electronic Control Unit (ECU) 44 electrically connected to each of the valves 30, 32, 34, 36, 39 for selectively opening and closing each of them, so as to control the air management system 20 to fill or empty the air springs 22. The air management system 20 may include or not include the air springs 22.

The height varying capabilities of the air management system 20 can be used to perform such functions as maintaining the vehicle ride height due to load variation, lowering the vehicle at speed to provide for improved fuel economy, lowering the vehicle to provide for ease in entering and exiting the vehicle, and for adjusting the height of respective sides of the vehicle for compensating for side-to-side load variations of the vehicle.

The compressor assembly 24 includes a compressor 21 and defines an air inlet 46 for receiving air into the compressor 21. The compressor assembly 24 also defines a compressed air port 50 for fluidly connecting the compressor 21 with, and providing air to the reservoir tank 38 and manifold block 27. The compressor 21 includes a motor 211 for drawing air through the air inlet 46. In the present case, the compressor 21 has a low-pressure stage 212 and a high-pressure stage 213 which are connected together pneumatically via an intermediate line 243, such that the compressed air drawn in by the air inlet 46 and pre-compressed in the low-pressure stage can flow into the high-pressure stage 242 where it is compressed further to a high-pressure level, in order then to be supplied to the compressed air port 50.

The compressor assembly 24 further defines a vent port 52 for relieving air from the air springs 22. Exemplarily, a muffler or silencer 28 is provided to define the vent port 52 and reduce noise, making the air leaving the system quieter.

The compressor assembly 24 further includes a compressed air main line 41 between the compressor 21 and the compressed air port 50, and a piloted exhaust valve (PEV) 11 arranged in the compressed air main line 41. The piloted exhaust valve 11 is connected to the vent port 52, and can provide a much larger opening path for quick exhaust during venting of the air spring 22, compared to the commonly used typical pneumatic solenoid valve with a 1.4 mm diameter small orifice.

Specifically, as shown in FIG. 2, the piloted exhaust valve 11 is an air pressure actuated valve and includes a valve body 111, a valve core 112 that is slidably disposed inside the valve body 111, and a spring 113 disposed inside the valve body 111 and abutted against the valve core 112. The valve body 111 defines a piloted control port 114, a first pneumatic port 115, a second pneumatic port 116, and a third pneumatic port 117. The reservoir tank 38 is pneumatically connected to the piloted control port 114. The first pneumatic port 115 is connected to the air main line 41, and the second pneumatic port 116 is connected to the vent port 52. The first pneumatic port 115 have a diameter, for example, of 6 mm, which is much larger than that of the typical pneumatic solenoid valve. As shown in FIG. 2, the piloted exhaust valve 11 is normally closed because the valve core 112 cuts off the fluid communication between the first pneumatic port 115 and the second pneumatic port 116 under the force of the spring 113. To overcome the spring force, as shown in FIG. 3, the valve core 112 is configured as a large stepped piston such that a control pressure from the reservoir tank 38 may act on the back face of the stepped piston via the piloted control port 114 to move the valve core 112 farther away from the first pneumatic port 115, thus establishing a larger opening path between the air main line 41 and the vent port 52 for quick exhaust of the air springs 22. As a result, the vehicle can be lowered in a very short time.

The reservoir tank 38, which is a large reservoir commonly used in most air management systems for filling air springs and located outside the compressor assembly, is configured to directly provide control pressure to the piloted control port 114. The term "directly provide" should be understood as providing the control pressure without routing it through any additional accumulator. The reservoir tank 38 may have a volume of about 7 to 16 liters. It should be understood that the pressure in the large reservoir tank 38 is nearly always much higher than the exhausted system pressure, such as the pressure in the compressed air main line 41. This means that the reservoir tank 38 is able to consistently provide such a higher control pressure to the piloted control port 114, allowing the piloted exhaust valve 11 to remain open for a longer duration, thus achieving lower exhaust pressures. This direct configuration eliminates the need for a separate pilot pressure accumulator, which in conventional systems is connected to the large reservoir tank through an accumulator check valve to trap high pressure for actuating the piloted exhaust valve 11, thereby offering a more cost-effective, compact, and simplified solution.

The compressor assembly 24 further includes an exhaust valve 29 pneumatically connecting the reservoir tank 38 to the piloted control port 114 of the piloted exhaust valve 11, enabling the reservoir tank 38 to selectively pressurize the piloted control port 114 via the exhaust valve 29. The exhaust valve 29 is further connected to the third pneumatic port 117 of the piloted exhaust valve 11.

The exhaust valve 29 may be configured as a three-way two-position solenoid valve, which has an unpowered closed state shown in FIG. 2 for establishing a fluid communication between the piloted control port 114 and the third pneumatic port 117, such that the front and back sides of the valve core 112 are at equal pressures when there is no control pressure input to the piloted control port 114. When being energized, the exhaust valve 29 transfers from the unpowered closed state into a powered open state shown in FIG. 3 for establishing a fluid communication between the reservoir tank 38 and the piloted control port 114 for venting.

With reference to FIG. 1, the compressor assembly 24 defines a reservoir port 51 which is connected to the reservoir tank 38 through a reservoir air line 66 and connected to the control port 291 of the exhaust valve 29 through an pressure transfer line 53, thus allowing air from the reservoir tank 38 to flow sequentially through the reservoir air line 66 into the reservoir port 51, then through the pressure transfer line 53 into the control port 291 of the exhaust valve 29, and finally to be directed to the piloted control port 114 through a piloted valve line 55.

With reference to FIG. 1, the compressor assembly 24 includes a dryer 40 coupled to the compressed air port 50 for reducing moisture in air supplied by the compressor 21 before the air enters the reservoir tank 38 and the air springs 22. The dryer 40 is arranged in the compressed air main line 41 and between the piloted exhaust valve 11 and the compressed air port 50. For example, the dryer 40 typically includes a desiccant disposed therein for absorbing excess moisture in the system that is conveyed through the compressed air main line 41. The moisture content of the desiccant is increased as air passes through the dryer 40 away from the compressor 21, and the moisture content of the desiccant is decreased as air passes through the dryer 40 and out the vent port 52. Additional control valves in the compressor assembly 24 may be utilized to direct flow.

The manifold block 27 fluidly connects the air springs 22, compressor 21, dryer 40, and reservoir tank 38. The manifold block 27 defines a compressor inlet port 54 which may include a cap for protecting it while not in use. A base air line 56 extends between the compressed air port 50 and the compressor inlet port 54 of the manifold block 27 for conveying air between the manifold block 27 and the compressor assembly 24. Furthermore, a central air line 63 is disposed inside the manifold block 27 and is connected to the compressor inlet port 54 such that it is fluidly connected to the base air line 56.

The manifold block 27 further defines four suspension ports 58 that are each fluidly connected to the central air line 63. A plurality of spring air lines 60 each extend between the central air line 63 and one of the air springs 22. Each of the spring air lines 60 includes a first portion that is disposed inside the manifold block 27 and extends from the central air line 63 to the suspension port 58, and a second portion that is disposed outside of the manifold block 27 and extends from the suspension port 58 to one of the air springs 22.

The manifold block 27 further includes a plurality of suspension valves 30, each disposed along one of the spring air lines 60 for inhibiting and allowing air to be conveyed between the manifold block 27 and the respective air springs

22. The suspension valves 30 are each electrically connected with the electronic control unit 44 for being selectively moved between an open position and a closed position. More specifically, each suspension valve 30 allows the passage of air between the air spring 22 and the central air line 63 while in the open position, and each suspension valve 30 inhibits the passage of air between the air spring 22 and the central air line 63 while the suspension valve 30 is in the closed position.

The reservoir tank 38 stores compressed air from the compressor assembly 24 for being distributed to the air springs 22. Because of the stored energy of the compressed air in the reservoir tank 38, the air management system 20 is able to adjust the height of each wheel independently and can elevate the vehicle much quicker due than it would be able to without the reservoir tank 38. The manifold block 27 defines a reservoir port 64 that is fluidly connected to the central air line 63. A portion of the reservoir air line 66 extends from the reservoir tank 38 to the central air line 63 for conveying air between the manifold block 27 and the reservoir tank 38. The reservoir air line 66 includes an inner segment inside the manifold block 27 between the central air line 63 and the reservoir port 64, and an outer segment disposed outside of the manifold block 27 between the reservoir tank 38 and the reservoir port 64 as well as the reservoir port 51.

The manifold block 27 further includes a first reservoir valve 32 and a second reservoir valve 34 that are each disposed in-line with the reservoir port 64 along the reservoir air line 66 inside the manifold block 27 for selectively inhibiting and allowing air to be conveyed between the manifold block 27 and reservoir tank 38. The first and second reservoir valves 32, 34 are each electrically connected with the electronic control unit 44 for selectively opening and closing the reservoir valves 32, 34.

The first and second reservoir valves 32, 34 are positioned in parallel relationship to one another, allowing one or both of the first and second valves 32, 34 to be closed at any given time. More specifically, the reservoir air line 66 splits into a first branch 69 and a second branch 74, and join back together along a portion of the reservoir air line 66 that is connected to the central air line 63. The first reservoir valve 32 is disposed along the first branch 69, and the second reservoir valve 34 is disposed along the second branch 74.

Each of the reservoir valves 32, 34 includes an orifice therein through which air passes. The size of the orifice of the first reservoir valve 32 is smaller than that of the orifice of the second reservoir valve 34. The size of the orifices of the reservoir valves 32, 34 may vary to provide different flow rates between the reservoir tank 38 and manifold block 27. Because of the presence of the pair of reservoir valves 32, 34, three distinct flow rates of air being conveyed through the reservoir valves 32, 34 are possible: 1) maximum flow-when both the first and second reservoir valves 32, 34 are open, 2) first reservoir valve half flow-when the first reservoir valve 32 is opened and the other is closed, and 3) second reservoir valve half flow when the second reservoir valve 34 is opened and the other is closed. It should be appreciated that under certain operating conditions, it can be desirable to utilize different flow rates of air into the air springs 22 to fill the air springs 22 at faster or slower rates.

As illustrated in FIG. 1, the manifold block 27 includes a boost valve 39 arranged in the inner segment of the reservoir air line 66, and defines a boost outlet port 65. The compressor assembly 24 defines a boost inlet port 81, and a boost air line 83 extends between the boost outlet port 65 and the boost inlet port 81. The boost valve 39 is pneumatically connected to the boost air line 83 for selectively directly connecting the reservoir tank 38 and compressor 21. The boost valve 39 may be electrically connected to the electronic control unit 44 for selectively opening and closing the boost valve 39. It should be appreciated that the boost valve 39 may be utilized to provide a reduction in startup torque of the compressor assembly 24 without exhausting the manifold block 27. The boost valve 39 can send additional air pressure via the boost inlet port 81 to the compressor 21 between stages to improve flow output in order to lift the vehicle more quickly.

A pressure sensor 42 is disposed in the manifold block 27 for measuring the pressure in the compressor assembly 24, reservoir tank 38 and/or air springs 22. In order to obtain individual readings of each of the air springs 22 or the reservoir tank 38, the manifold block 27 is evacuated and then the valve(s) 30, 32, 34 for the device in question are momentarily opened such that the pressure that corresponds with the device in question may be measured. As such, it should be appreciated that the pressure sensor 42 may be utilized to verify that the compressor assembly 24, reservoir tank 38 and valves 30, 32, 34 are operating properly.

A dryer control valve 36 is provided in-line with the compressor inlet port 54. The dryer control valve 36 is electrically connected to the electronic control unit 44 for selectively opening and closing the dryer control valve 36. Except when venting in most circumstances, the dryer control valve 36 is left closed to permit one-way flow from the compressor 24 to the manifold block 27 via the lightly sprung valve seat. Thus, when an individual pressure reading is required of either the reservoir tank 38 or of any combination of the air springs 22, the dryer control valve 36 isolates the dryer volume from the manifold block 27. Since the manifold block 27 consists largely of small drilled holes connecting the components together, with the dryer control valve 36 closed, there is very little air volume exposed to the pressure sensor 42 as opposed to the volume of the manifold block 27, dryer 40 and base air line 56. This allows the pressure reading of a specific device to stabilize almost instantaneously and with very little air volume loss, thus making them much faster and more efficient. Accordingly, implementing the dryer control valve 36 improves the speed and efficiency of taking pressure readings.

Figure 4:
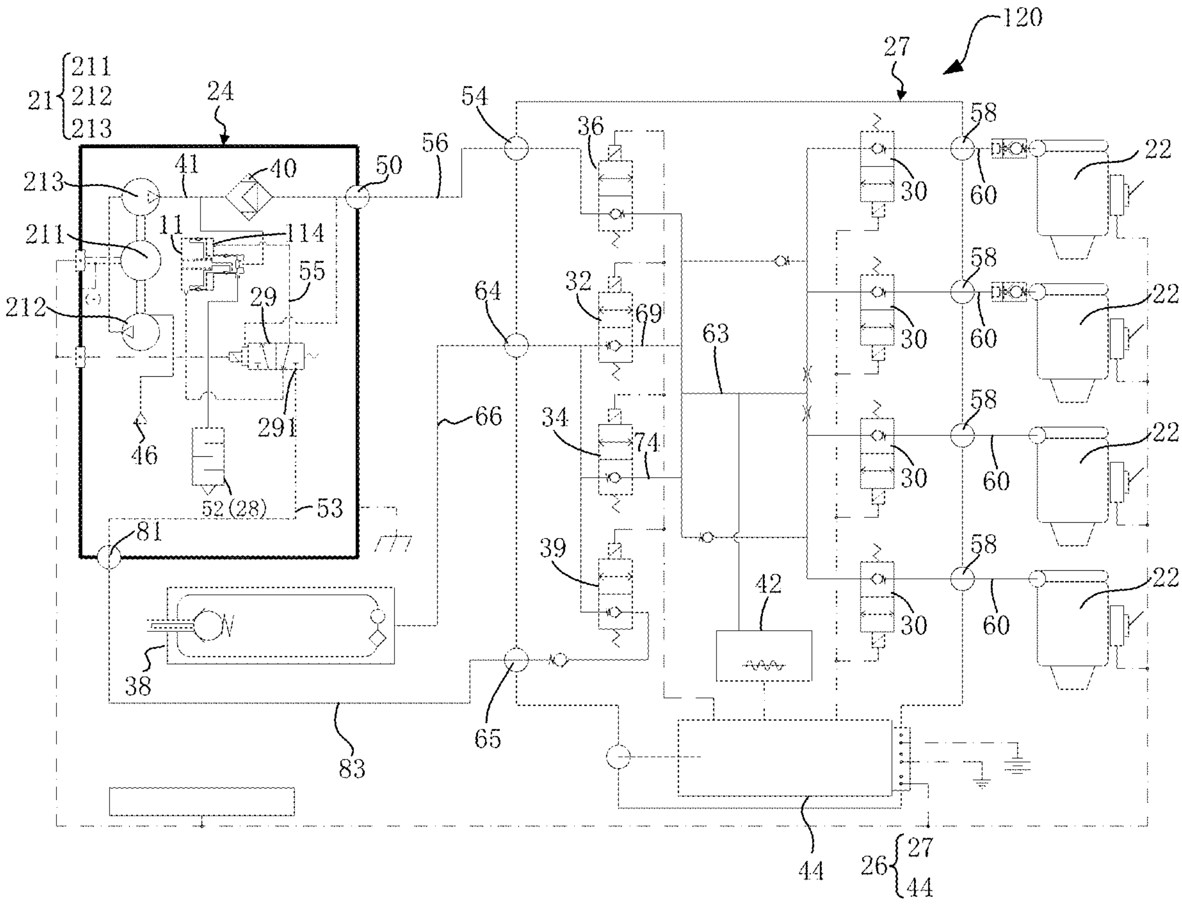
FIG. 4 is a schematic diagram of an air management system according to a second example embodiment of the present disclosure.

FIG. 4 is a schematic diagram of an air management system 120 according to a second example embodiment of the present disclosure. The air management system 120 shown in FIG. 4 differs substantially from the system 20 shown in FIG. 1 in the path from the reservoir tank 38 to the control port 291 of the exhaust valve 29. Specifically, as shown in FIG. 4, the reservoir tank 38 is pneumatically connected to the control port 291 of the exhaust valve 29 via the boost valve 39 of the manifold block 27 and the boost inlet port 81 of the compressor assembly 24, eliminating the reservoir port 51 as shown in FIG. 1. The pressure transfer line 53 as shown in FIG. 1 is changed to connect the control port 291 of the exhaust valve 29 directly to the boost inlet port 81, which is no longer connected to the pumping elements of the compressor 21. In this design, the boost function of the compressor 21 is eliminated. For some vehicles, this design may not pose a problem and depends upon the raising rate requirements.

In this design as shown in FIG. 4, the pressure of the reservoir tank 38 is routed through the existing boost outlet port 65 and boost inlet port 81. This design allows air from the reservoir tank 38 to flow sequentially through the reservoir air line 66 into the reservoir port 64, then into the boost valve 39, through the boost air line 83 to the boost inlet port 81, via the pressure transfer line 53 to the control port 291 of the exhaust valve 29, and finally to be directed to the piloted control port 114 of the piloted exhaust valve 11. Since the reservoir pressure (i.e., the pressure from the reservoir tank 38) is almost always higher than the exhausted system pressure, this design can also maintain the piloted exhaust valve 11 in an open state longer to achieve lower exhaust pressures.

Figure 5:
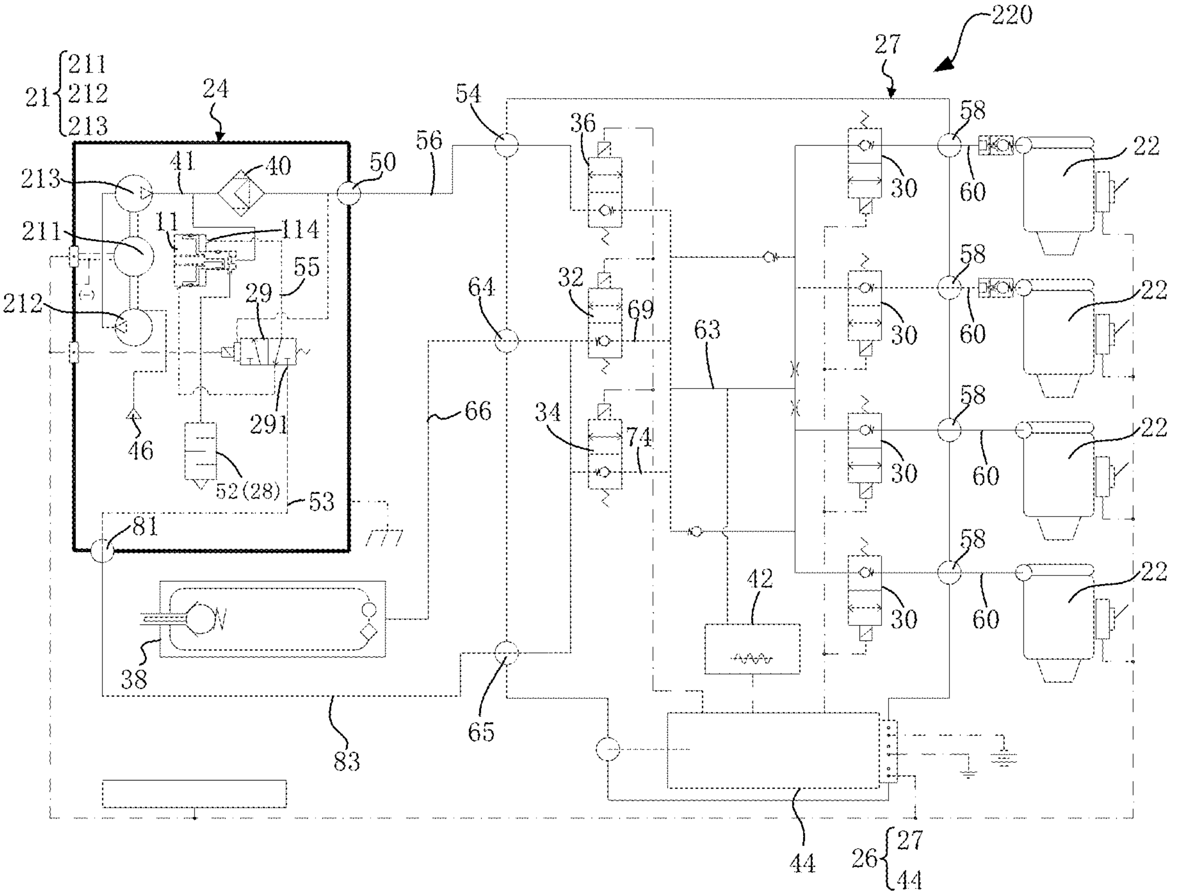
FIG. 5 is a schematic diagram of an air management system according to a third example embodiment of the present disclosure.

FIG. 5 is a schematic diagram of an air management system 220 according to a third example embodiment of the present disclosure. The air management system 220 shown in FIG. 5 differs substantially from the system 120 shown in FIG. 4 in that the boost valve 39 is eliminated, thus providing cost savings. In this design, as shown in FIG. 3, due to the elimination of the boost valve 39, the boost air line 83 may, more accurately, be referred to as a non-boost air line, the boost inlet port 81 may be termed a non-boost inlet port, and the boost outlet port 65 may be termed a non-boost outlet port. The non-boost air line is partially located within the manifold block 27. It should be appreciated that the term "non-boost" indicates that the non-boost air line, the non-boost inlet port and the non-boost outlet port are not associated with, for example, not connected to, a boost valve. This design eliminates the boost function of the compressor 21, as this function is not always needed in every system.

Figure 6:
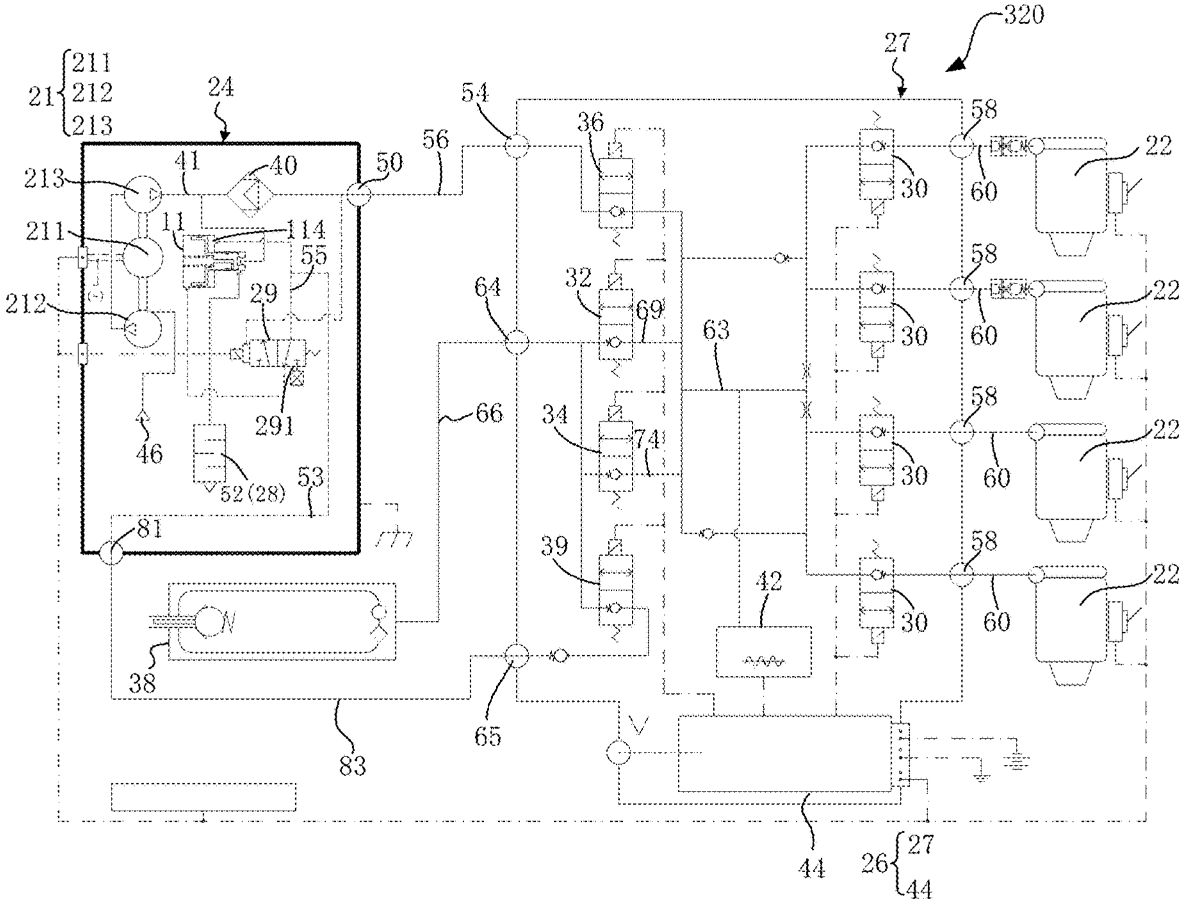
FIG. 6 is a schematic diagram of an air management system according to a fourth example embodiment of the present disclosure.

FIG. 6 is a schematic diagram of an air management system 320 according to a fourth example embodiment of the present disclosure. The air management system 320 shown in FIG. 4 differs substantially from the system 20, 120, 220 shown in FIGS. 1, 4 and 5 in the path from the reservoir tank 38 to the piloted control port 114 of the piloted exhaust valve 11. Specifically, the reservoir tank 38 is pneumatically connected to the piloted control port 114 of the piloted exhaust valve 11 independently of the exhaust valve 29. In other words, the air from the reservoir tank 38 does not pass through the exhaust valve 29. In particular, the pressure transfer line 53 as shown in FIG. 2 is changed to connect the boost inlet port 81 directly to the piloted control port 114 of the piloted exhaust valve 11.

This design allows air from the reservoir tank 38 to flow sequentially through the reservoir air line 66 into the reservoir port 64, then into the boost valve 39, through the boost air line 83 to the boost inlet port 81, via the pressure transfer line 53 to the piloted control port 114, without passing through the exhaust valve 29. As a result, the high pressure from the reservoir tank 38 can maintain the piloted exhaust valve 11 in an open state longer to achieve lower exhaust pressures.

In this design, the boost valve 39 may be a two-way blocker valve, which can activate the piloted exhaust valve 11 to an open position when it is energized (i.e., the boost valve 39 opens). To return the piloted exhaust valve 11 to its closed position, the boost valve 39 closes, and the exhaust valve 29 opens to vent the air pressure that was used to activate the piloted exhaust valve 11.

In this design as shown in FIG. 6, the boost function of the compressor assembly 24 is also eliminated, and the boost valve 39 is required to control application of reservoir air pressure to the piloted exhaust valve 11. At the same exact time, or preferably slightly before, the exhaust valve 29 must be energized to further trap the reservoir pressure from escaping. In the same way as the system shown in FIGS. 1, 4 and 5, the exhaust valve 29 may be configured as a three-way two-position solenoid valve, but it differs in that the control port 291 of the exhaust valve 29 in this design is blocked off.

Figure 7:
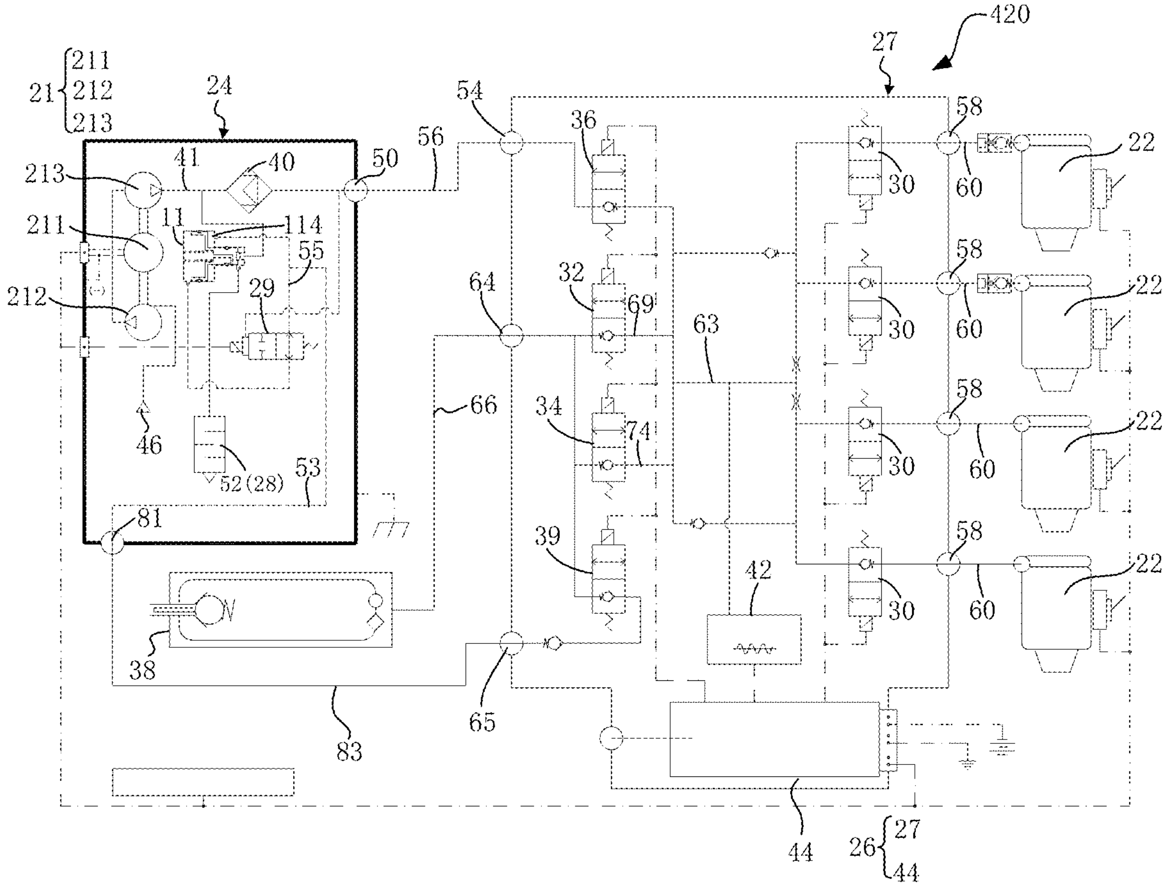
FIG. 7 is a schematic diagram of an air management system according to a fifth example embodiment of the present disclosure.

FIG. 7 is a schematic diagram of an air management system 420 according to a fifth example embodiment of the present disclosure. The air management system 420 shown in FIG. 7 differs substantially from the system 320 shown in FIG. 6 in that the exhaust valve 29 is changed from a three-way two-position solenoid valve to a lower cost two-way two-position solenoid valve. In this design, the exhaust valve 29 may be configured as two two-way two-position solenoid valves that act in tandem, that is exhaust valve 29 and boost valve 39.

Figure 8:
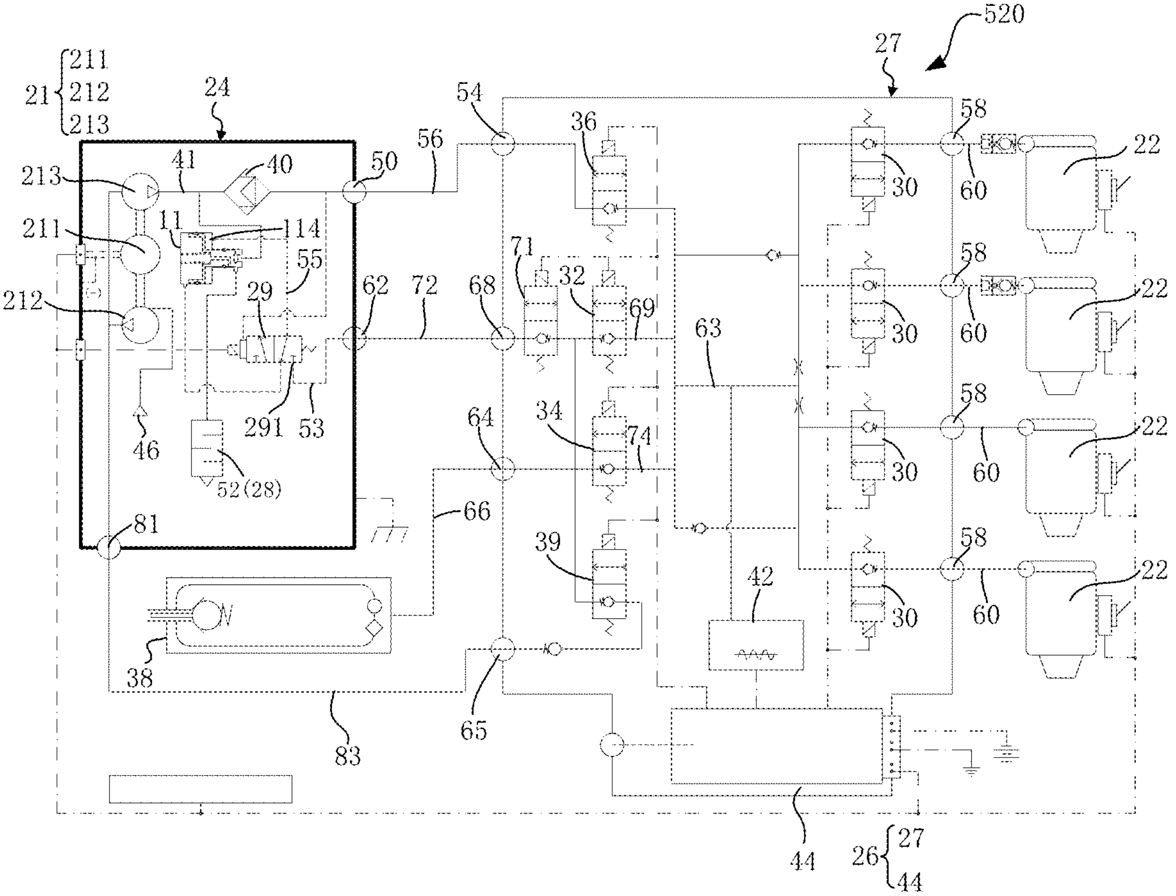
FIG. 8 is a schematic diagram of an air management system according to a sixth example embodiment of the present disclosure.

FIG. 8 is a schematic diagram of an air management system 520 according to a sixth example embodiment of the present disclosure. The air management system 520 shown in FIG. 8 differs substantially from the system 20 shown in FIG. 1 in the path from the reservoir tank 38 to the control port 291 of the exhaust valve 29. Specifically, as shown in FIG. 8, a first exhaust port 68 and an exhaust control valve 71 are added to the manifold block 27, and a second exhaust port 62 is added to the compressor assembly 24 to replace the reservoir port 51 shown in FIG. 1. The second exhaust port 62 is connected to the first exhaust port 68 through an external air line 72. In the same way as the system shown in FIG. 1, the outer segment of the reservoir air line 66, disposed outside of the manifold block 27, is between the reservoir tank 38 and the reservoir port 64. In a different way from the system shown in FIG. 1, the inner segment of the reservoir air line 66, disposed inside the manifold block 27, is further provided with the exhaust control valve 71 in addition to the first and second reservoir valves 32, 34. The exhaust control valve 71 is configured to selectively control air flow between the reservoir air line 66 and the normally closed control port 291 of the exhaust valve 29. In addition, the exhaust control valve 71 adds some additional robustness to the design in that it would prevent loss of pressure if the external air line 72 should develop a leak. The exhaust control valve 71 and the exhaust valve 29 need to work in unison to activate the exhaust cycle.

In this design as shown in FIG. 8, the pressure of the reservoir tank 38 is routed through the reservoir port 64, the first exhaust port 68 and the second exhaust port 62. This design allows air from the reservoir tank 38 to flow sequentially through the reservoir air line 66 into the reservoir port 64, then into the exhaust control valve 71, through the first exhaust port 68 and external air line 72 to the second exhaust port 62, via the pressure transfer line 53 to the control port 291 of the exhaust valve 29, and finally to be directed to the piloted control port 114 of the piloted exhaust valve 11. Since the reservoir pressure is almost always higher than the exhausted system pressure, this design can also maintain the piloted exhaust valve 11 in an open state longer to achieve lower exhaust pressures.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air management system for a vehicle having a body and plurality of wheels, the air management system comprising:

a reservoir tank for storing compressed air and filling at least one air spring of the vehicle; and a compressed air supply unit for supplying the compressed air, comprising:

a compressed air port to the reservoir tank and to the at least one air spring;

a vent port to a venting environment; and a piloted exhaust valve connected to the compressed air port and configured to vent the at least one air spring through the vent port, the piloted exhaust valve having a piloted control port;

wherein the reservoir tank is pneumatically connected to the piloted control port of the piloted exhaust valve, and is configured to provide a control pressure to the piloted control port to open the piloted exhaust valve during venting of the at least one air spring;

wherein the compressed air supply unit further comprises:

a compressor for providing compressed air to the reservoir tank and having at least one compressor stage;

a compressed air main line between the compressor and the compressed air port, the piloted exhaust valve being arranged in the compressed air main line;

wherein the reservoir tank is configured to provide, independently of the pressure in the compressed air main line, the control pressure that is higher than a pressure in the compressed air main line to the piloted control port during venting of the at least one air spring.

2. The air management system according to claim 1, wherein the compressed air supply unit further comprises an exhaust valve connected to the piloted control port, and the reservoir tank is pneumatically connected to and selectively pressurizes the piloted control port of the piloted exhaust valve via the exhaust valve.

3. The air management system according to claim 2, wherein the compressed air supply unit defines a reservoir port, the reservoir tank is pneumatically connected to the reservoir port through a reservoir air line, and the reservoir port is pneumatically connected to a control port of the exhaust valve through a pressure transfer line.

4. The air management system according to claim 2, wherein the air management system further comprises a manifold block, which pneumatically connects the at least one air spring, the compressed air port and the reservoir tank; and the reservoir tank is pneumatically connected to a control port of the exhaust valve via the manifold block.

5. The air management system according to claim 4, wherein the manifold block comprises a boost valve and defines a boost outlet port, the compressed air supply unit defines a boost inlet port, and the reservoir tank is pneumatically connected to the control port of the exhaust valve via the boost valve, the boost outlet port and the boost inlet port.

6. The air management system according to claim 4, wherein the compressed air supply unit defines a non-boost inlet port, the manifold block defines a non-boost outlet port, and the reservoir tank is pneumatically connected to the control port of the exhaust valve via the non-boost outlet port and the non-boost inlet port.

7. The air management system according to claim 4, wherein the manifold block comprises an exhaust control valve and defines a first exhaust port; and the compressed air supply unit defines a second exhaust port, and the reservoir tank is pneumatically connected to the control port of the exhaust valve via the exhaust control valve, the first exhaust port, and the second exhaust port.

8. The air management system according to claim 1, wherein the compressed air supply unit further comprises an exhaust valve connected to the piloted exhaust valve, and the reservoir tank is pneumatically connected to, independently of the exhaust valve, the piloted control port of the piloted exhaust valve.

9. The air management system according to claim 8, wherein the air management system further comprises a manifold block, which pneumatically connects the at least one air spring, the compressed air port and the reservoir tank; and the reservoir tank is pneumatically connected to, independently of the exhaust valve, the piloted control port of the piloted exhaust valve via the manifold block.

10. The air management system according to claim 9, wherein the manifold block comprises a boost valve and defines a boost outlet port, the compressed air supply unit defines a boost inlet port, and the reservoir tank is pneumatically connected to, independently of the exhaust valve, the piloted control port of the piloted exhaust valve via the boost valve, the boost outlet port and the boost inlet port.

11. The air management system according to claim 8, wherein the exhaust valve is a three-way two-position valve which has a control port being blocked off, or the exhaust valve is a two-way two-position valve.

12. The air management system according to claim 1, further comprising:

a central air line disposed between the at least one air spring and the compressed air port and fluidly connected to the least one air spring and the compressed air port;

at least one spring air line extending between the central air line and the at least one air spring; and at least one suspension valve disposed along the at least one spring air line for selectively allowing and preventing air from flowing between the at least one air spring and the central air line.

13. The air management system according to claim 12, further comprising:

a reservoir air line extending between the reservoir tank and the central air line; and a first reservoir valve and a second reservoir valve that are disposed along the reservoir air line, each of the first and second reservoir valves having an orifice for allowing air to pass therethrough, and each of the reservoir valves selectively allowing air to pass through the reservoir valve between the reservoir tank and the central air line.

14. The air management system according to claim 13, wherein the compressed air supply unit comprises a compressor for providing compressed air to the reservoir tank and having at least one compressor stage, and defines a boost inlet port; and the air management system further comprises a boost valve between the reservoir air line and a boost air line which is connected to the boost inlet port for allowing air from the reservoir tank to pass to the compressor or the piloted control port via the boost inlet port.

15. The air management system according to claim 13, further comprising:

an electronic control unit electrically connected to each of the at least one suspension valve and the first and second reservoir valves for selectively opening and closing each of them; and a pressure sensor electrically coupled to the electronic control unit and connected to the central air line for reading a pressure of the at least one air spring.

16. The air management system according to claim 13, further comprising:

a dryer disposed inside the compressed air supply unit and coupled to the compressed air port for reducing moisture in air supplied by the compressed air supply unit before the air enters the reservoir tank and the at least one air spring; and a dryer isolation valve disposed in-line with the compressed air port for allowing the central air line to be isolated from the dryer.

17. The air management system according to claim 1, wherein the reservoir tank is an external tank located outside of the compressed air supply unit and has a volume of 7 to 16 liters.

18. An air management system for a vehicle having a body and plurality of wheels, the air management system comprising:

a reservoir tank for storing compressed air and filling at least one air spring of the vehicle; and a compressed air supply unit for supplying the compressed air, comprising:

a compressed air port to the reservoir tank and to the at least one air spring;

a vent port to a venting environment; and a piloted exhaust valve connected to the compressed air port and configured to vent the at least one air spring through the vent port, the piloted exhaust valve having a piloted control port;

wherein the reservoir tank is pneumatically connected to the piloted control port of the piloted exhaust valve, and is configured to provide a control pressure to the piloted control port to open the piloted exhaust valve during venting of the at least one air spring;

the compressed air supply unit further comprises an exhaust valve connected to the piloted control port, and the reservoir tank is pneumatically connected to and selectively pressurizes the piloted control port of the piloted exhaust valve via the exhaust valve;

the air management system further comprises a manifold block, which pneumatically connects the at least one air spring, the compressed air port and the reservoir tank; and the reservoir tank is pneumatically connected to a control port of the exhaust valve via the manifold block;

the compressed air supply unit defines a non-boost inlet port, the manifold block defines a non-boost outlet port, and the reservoir tank is pneumatically connected to the control port of the exhaust valve via the non-boost outlet port and the non-boost inlet port.

* * * * *